Dec. 11, 1928.
C. H. WILL
1,694,676
ANTIFROSTING DEVICE FOR WINDOWS
Filed March 21, 1925
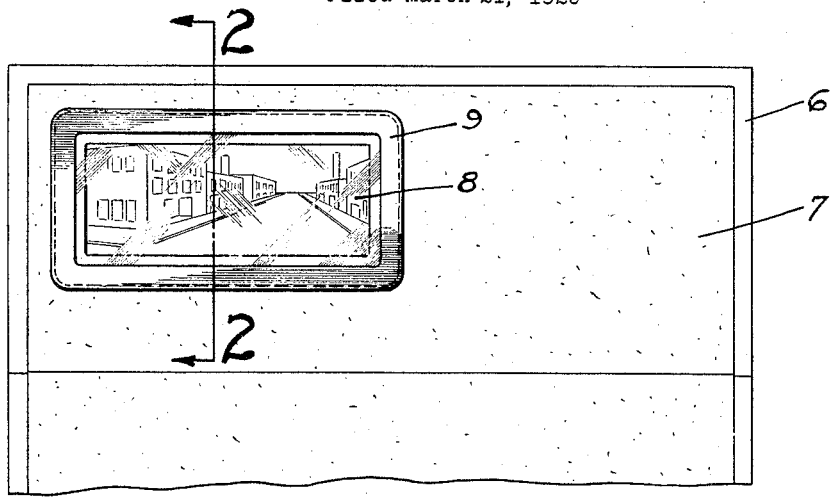
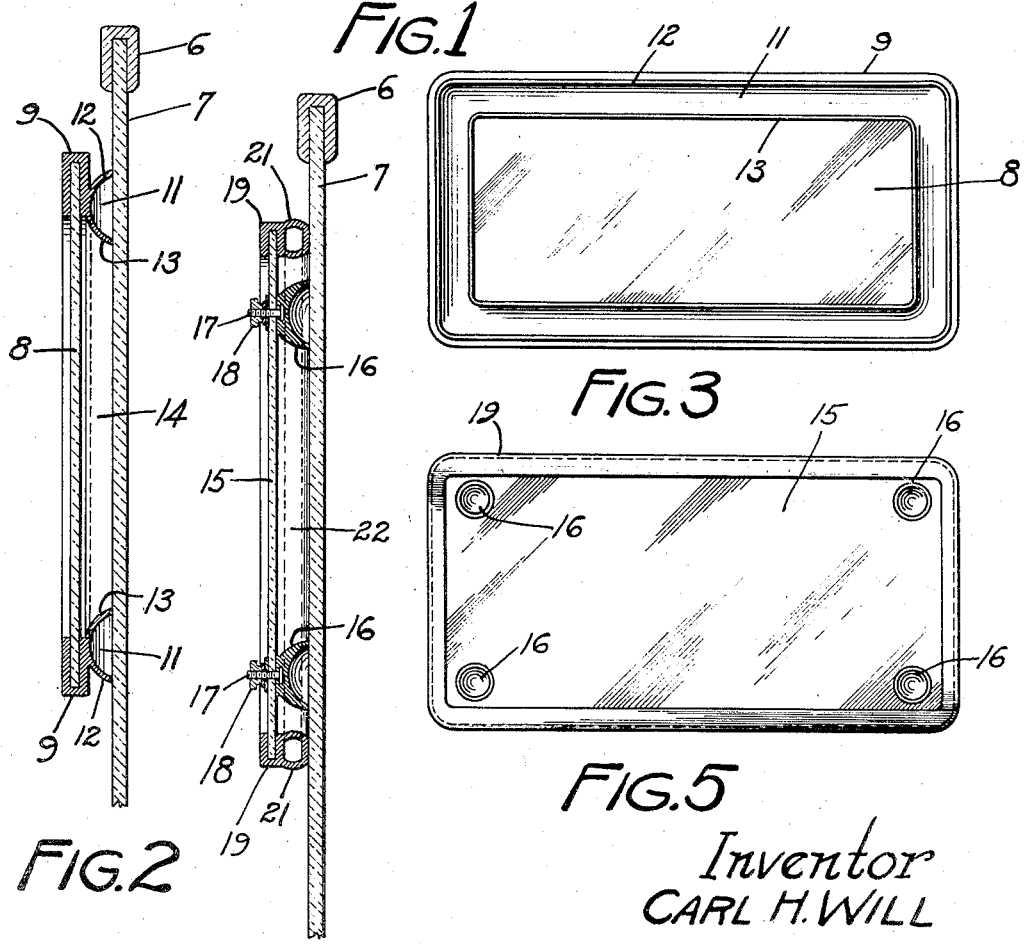
Inventor
CARL H. WILL
By Paul, Paul & Moore
ATTORNEYS Patented Dec. 11, 1928.

1,694,676

UNITED STATES PATENT OFFICE.

CARL H. WILL, OF MINNEAPOLIS, MINNESOTA, ASSIGNOR TO C. H. WILL MOTORS CORPORATION, OF MINNEAPOLIS, MINNESOTA, A CORPORATION OF MINNESOTA.

ANTIFROSTING DEVICE FOR WINDOWS.

Application filed March 21, 1925. Serial No. 17,285.

This invention relates to an improved antifrosting device adapted for use on windows to prevent the accumulation of frost thereon and more particularly relates to such a device adapted to be demountably mounted upon the windshield of a power propelled vehicle, such as an automobile, bus or truck. and which functions to cooperate with the windshield to prevent frost from accumulating on the latter in cold weather, with the resultant obscuring of the driver's vision.

An object of the invention is to provide such a device having means thereon whereby it may readily and quickly be mounted upon the flat surface of a window pane or a windshield without the use of screws or bolts, and also without the necessity of having to mar the frame of the windshield or window.

A further and more specific object of the invention is to provide an anti-frosting device comprising a glass panel mounted in a frame of flexible material having a trough-like member on one side thereof which, when pressed against the surface of a windshield, will be securely held thereon by suction caused by a vacuum being created within the trough-like member when pressed against the wind shield.

A further object is to provide an anti-frosting device consisting of a panel of transparent material having means for securing it to a surface of a windshield or window in spaced relation thereto so that a dead air space will be provided between it and the windshield, thereby preventing frost from accumulating upon that portion of the windshield covered by the device.

The particular object of the invention therefore is to provide an anti-frosting device for windows which may readily and conveniently be mounted upon a flat surface and will be held thereon by suction when firmly pressed against such surface.

Other objects of the invention will appear from the following description and the accompanying drawings and will be pointed out in the annexed claims.

In the drawings there has been disclosed a structure designed to carry out the various objects of the invention, but it is to be understood that the invention is not confined to the exact features shown as various changes may be made within the scope of the claims which follow.

In the drawings:

Figure 1 is an elevational view of a portion of a windshield showing the improved anti-frosting device mounted thereon;

Figure 2 is a sectional view on the line 2—2 of Figure 1 showing the means provided for securing it to the windshield;

Figure 3 is a view of the device removed from the windshield and showing the trough-like member provided on one side thereof for securing it to the window or windshield; and Figures 4 and 5 are views showing a modified construction.

In the selected embodiment of the invention here shown, the anti-frosting device is shown mounted upon an ordinary windshield such as is commonly used in the construction of automobiles, buses and trucks. This windshield comprises a frame 6 having the usual pane of glass 7 mounted therein.

The novel anti-frosting device herein shown preferably comprises a glass panel 8 mounted in a suitable frame 9 which preferably is constructed of a flexible material such as rubber. This frame is substantially U-shaped in cross-section and is adapted to be fitted over the edges of the panel 8 as shown in Figure 2. The frame 9 is therefore preferably of a flexible material which will have sufficient elasticity to permit it to be stretched sufficiently to receive the glass as shown in Figures 1 and 3.

The means provided for securing the device to the surface of the windshield preferably consists in providing a trough-like groove 11 on one side of the frame 9 which groove may be readily formed by means of the arcuate flanges 12 and 13 preferably integrally formed on the inner side of the frame. In mounting the device upon the windshield, the surface of the latter is preferably first moistened with a damp cloth or other means after which the flanges 12 and 13 will be placed against the surface of the windshield and pressure applied thereto by bearing against the frame 9. By thus pressing the device against the windshield, the air will be forced out of the trough-like groove 11 so that when the pressure is released from the frame a vacuum will be built up in the annular groove 11, thereby causing a suction to be built up therein which will securely hold the frame, and therefore the panel 8 in position upon the surface of the windshield. When the device is thus positioned upon the windshield, it will be noted that a dead air space 14 will be provided between the adjacent surfaces of the windshield and the panel 8 which will prevent the warm air or heat from the interior of the vehicle from coming into direct contact with that portion of the windshield encircled by the flexible flange 13, thereby positively preventing frost from accumulating upon the encircled portion of the windshield. By this novel means of securing the device to the windshield, it will readily be seen that such device may be mounted upon any portion or surface of the windshield either inside or outside of the vehicle without the use of bolts or screws, or in any way marring the surface or frame of the windshield. If desired, it may also be mounted upon other types of windows in a similar manner.

In Figures 4 and 5, there is shown a modified form wherein the means provided for securing the device to the windshield are constructed independently of the frame encircling the glass panel 15. In the construction here shown, the glass panel 15 preferably has a plurality of suction cups 16 secured thereto by means of screws 17 and nuts 18. These suction cups 16 are preferably located adjacent the corners of the panel 15 as shown in Figure 5. The panel 15 is mounted in a frame 19 which also is of flexible material so that it may be stretched sufficiently to receive the panel as shown in Figure 4. The inner side of the frame 19 preferably has a hollow tube-like member 21 formed thereon which is adapted to be pressed into contact with the surface of the windshield to tightly seal the joint between the frame 19 and the windshield when the device is mounted thereon, as shown in Figure 4. In the construction shown in Figures 4 and 5, the suction cups 16 merely function to secure the device to the windshield while the dead air space 22 provided between the panel 15 and the windshield is formed by the tube-like member 21 being firmly pressed against the surface of the windshield thereby preventing leakage of air therebetween.

From the foregoing therefore, it will readily be seen and understood that this novel anti-frosting device may be conveniently mounted upon any flat surface for the purpose of preventing frost from accumulating upon such surface. The suction in the annular groove 11 and also in the suction cups 16 will also be sufficient to retain the device in such position for an indefinite length of time without danger of it accidentally becoming detached therefrom. In the drawings and also in the description, the panels 8 and 15 have been referred to as being of glass but it is to be understood that they may be made of any suitable transparent material which may be used for the purpose specified.

I claim as my invention:

1. A frame of elastic material having a transparent window sealingly secured therein, and further having a continuous semi-tubular suction channel connected by its central portion only and having opposite support-engaging edges in a plane parallel with the face of the frame, and defining and surrounding a central inner space, and non-communicating with said space, during and after application to a support, and forming with the window an interior non-suction chamber.

2. A frame of elastic material having a transparent window sealingly secured therein, and further having a substantially semi-tubular thin-walled suction channel having opposite support-engaging edges in a plane parallel with the face of the frame, and defining and surrounding a central inner space, and non-communicating with said space, during and after application to a support, and forming with the window an interior non-suction chamber.

3. A frame of elastic material having a transparent window sealingly secured therein, and further having a continuous semi-tubular suction channel having opposite support-engaging edges in a plane parallel with the face of the frame, and lying unobstructedly within the perimeter of the frame, and defining and surrounding a central inner space, and non-communicating with said space, during and after application to a support, and forming with the window an interior non-suction chamber.

4. A rectangular frame of elastic material having a deep rectangular groove, and a transparent plate sealingly secured in said groove, said frame having an integral continuous substantially semi-circular tubular thin-walled concaved suction channel, of relatively small cross-sectional area, the opposite peripheral support-engaging edges of said channel being parallel with the outer face of the frame, before and after application, said channel adapted to form with a support a central dead air space, whereby the walls of the suction channel undergo no substantial circumferential tension when in suction position.

5. An attachment for windshields of automobiles or like transparent plates, including a transparent element, a continuous U-shaped member receiving the marginal edges of said element therein, and a continuous, flexible, part-tubular suction channel upon said U-shaped member to contact with the windshield or plate, the windshield- or plate-engaging edges of said suction channel being approximately parallel with the adjacent face of said U-shaped member, and an intermediate portion of said suction channel being formed integrally with said adjacent face and lying within the confines of said transparent element.

In witness whereof, I have hereunto set my hand this 18th day of March, 1925.

CARL H. WILL.